US012804101B2

(12) United States Patent
Mizomori

(10) Patent No.: US 12,804,101 B2

(45) Date of Patent: Nov. 17, 2026

(54) CONTROL METHOD, CONTROL SYSTEM, AND NON-TRANSITORY COMPUTER-READABLE STORAGE MEDIUM STORING INFORMATION PROCESSING PROGRAM

(71) Applicant: SEIKO EPSON CORPORATION, Tokyo (JP)

(72) Inventor: Masaki Mizomori, Oita (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 19/087,789

(22) Filed: Mar. 24, 2025

(65) Prior Publication Data

US 2025/0310471 A1 Oct. 2, 2025

(30) Foreign Application Priority Data

Mar. 28, 2024 (JP) ................................ 2024-053439

(51) Int. Cl.
*H04N 5/74* (2006.01)
*G06T 5/50* (2006.01)

(52) U.S. Cl.
CPC ................. *H04N 5/74* (2013.01); *G06T 5/50* (2013.01); *G06T 2207/20221* (2013.01)

(58) Field of Classification Search
None
See application file for complete search history.

(56) References Cited

U.S. PATENT DOCUMENTS

2022/0264062 A1 8/2022 Nishimoto et al.
2023/0161468 A1 5/2023 Yoshida
2025/0260794 A1* 8/2025 Ma ...................... G06F 3/04845

FOREIGN PATENT DOCUMENTS

JP 2013-192098 A 9/2013
JP 2022-126127 A 8/2022
JP 2023-077506 A 6/2023

* cited by examiner

*Primary Examiner* — Samira Monshi
(74) *Attorney, Agent, or Firm* — Dority & Manning, P.A.

(57) ABSTRACT

A control method includes: acquiring a picked-up image generated by a camera, the picked-up image including a first projection image and a second projection image; causing a display to display a screen including the picked-up image; accepting, via the screen, an operation of designating a range in which a composite image formed by combining the first projection image and the second projection image is formed on a projection target; generating first information including at least one first adjustment amount of the first projection image to form the composite image, based on the operation; and transmitting the first information to the first projector.

8 Claims, 12 Drawing Sheets

CONTROL METHOD, CONTROL SYSTEM, AND NON-TRANSITORY COMPUTER-READABLE STORAGE MEDIUM STORING INFORMATION PROCESSING PROGRAM

The present application is based on, and claims priority from JP Application Serial Number 2024-053439, filed Mar. 28, 2024, the disclosure of which is hereby incorporated by reference herein in its entirety.

BACKGROUND

1. Technical Field

The present disclosure relates to a control method, a control system, and a non-transitory computer-readable storage medium storing an information processing program.

2. Related Art

According to the related art, there is a technique in which, when projecting a projection image by using a projector, a user designates a projection range via a display provided in an information processing device that is different from the projector, in order to designate a projection range of the projection image on a projection target where the projection image is to be projected.

For example, JP-A-2022-126127 discloses an information processing device which causes a display to display an image of a room, based on room information indicating the three-dimensional shape of the room, accepts a user's operation of designating a wall surface to be a projection destination of a projection image, via a touch panel installed at the display, and thus specifies the wall surface designated by the user as a projection surface.

JP-A-2022-126127 is an example of the related art.

In JP-A-2022-126127, it is not assumed that stacked projection or tiled projection for projecting a plurality of projection images is executed.

SUMMARY

According to an aspect of the present disclosure, a control method for an electronic device configured to communicate with a first projector that projects a first projection image onto a projection target is provided, and the control method includes: acquiring a picked-up image generated by a camera, the picked-up image including the first projection image and a second projection image projected from a second projector that is different from the first projector; causing a display to display a screen including the picked-up image; accepting, via the screen, an operation of designating a range in which a composite image formed by combining the first projection image and the second projection image is formed on the projection target; generating first information including at least one first adjustment amount of the first projection image to form the composite image, based on the operation; and transmitting the first information to the first projector.

According to another aspect of the present disclosure, a control system including a first projector that projects a first projection image onto a projection target and an electronic device configured to communicate with the first projector is provided, and the electronic device executes: acquiring a picked-up image generated by a camera, the picked-up image including the first projection image and a second projection image projected from a second projector that is different from the first projector; causing a display to display a screen including the picked-up image; accepting, via the screen, an operation of designating a range in which a composite image formed by combining the first projection image and the second projection image is formed on the projection target; generating first information including at least one first adjustment amount of the first projection image to form the composite image, based on the operation; and transmitting the first information to the first projector, and the first projector executes: adjusting the first projection image, based on the first adjustment amount.

According to still another aspect of the present disclosure, a non-transitory computer-readable storage medium storing an information processing program is provided, and the information processing program causes a computer that controls an electronic device configured to communicate with a first projector that projects a first projection image onto a projection target, to execute: acquiring a picked-up image generated by a camera, the picked-up image including the first projection image and a second projection image projected from a second projector that is different from the first projector; causing a display to display a screen including the picked-up image; accepting, via the screen, an operation of designating a range in which a composite image formed by combining the first projection image and the second projection image is formed on the projection target; generating first information including at least one first adjustment amount of the first projection image to form the composite image, based on the operation; and transmitting the first information to the first projector.

DESCRIPTION OF EMBODIMENTS

Figure 1:
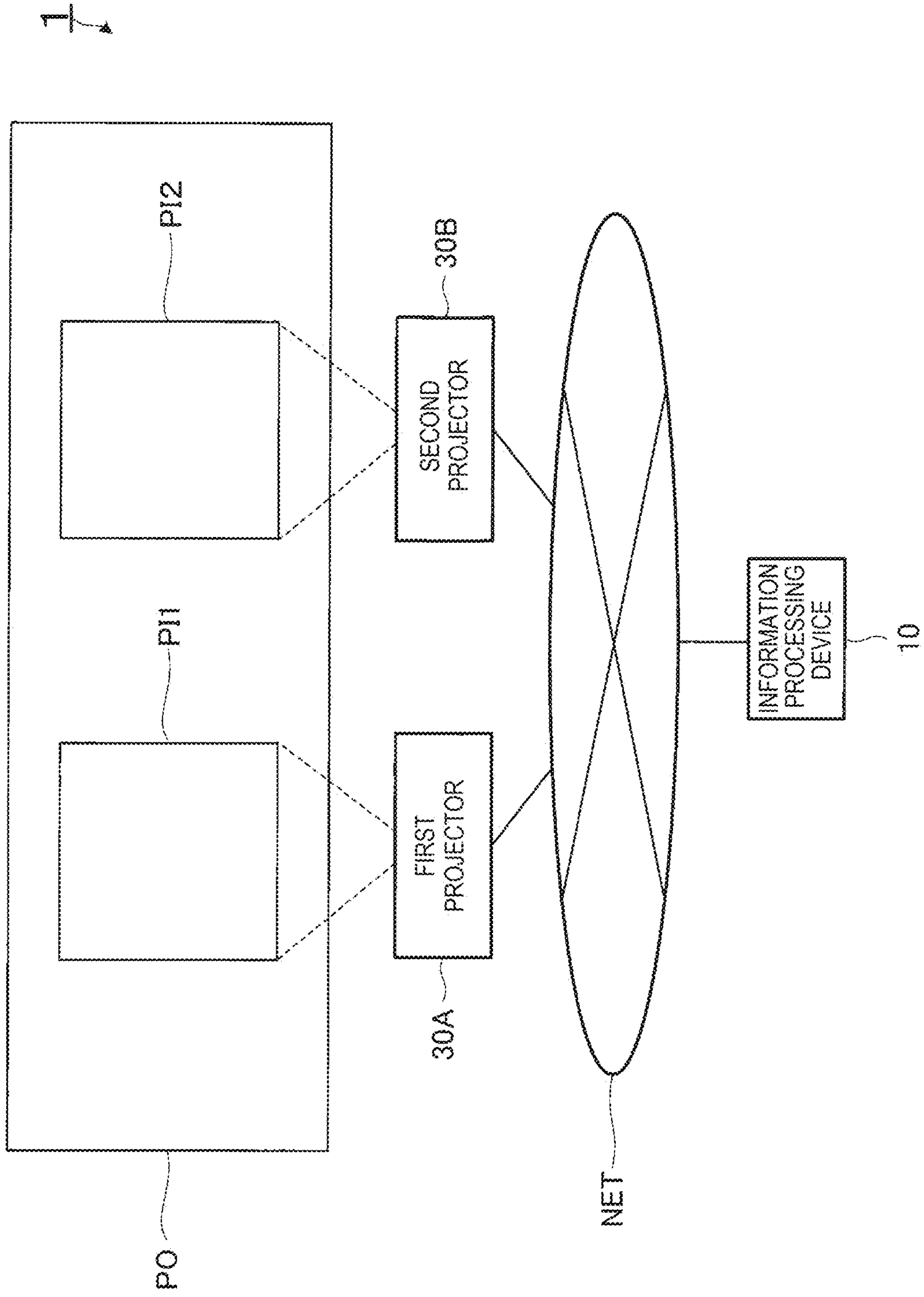
FIG. 1 is a block diagram showing an overall configuration of a control system 1.

Embodiments of the present disclosure will now be described with reference to the drawings. In the drawings, the dimension and scale of each part are made different from the actual dimension and scale as appropriate. The embodiments described below are preferred specific examples of the present disclosure and therefore include various technically preferable limitations, but the scope of the present disclosure is not limited to these embodiments unless there is particularly a description to the effect that the present disclosure is limited.

1: First Embodiment

1-1: Configuration of First Embodiment

1-1-1: Overall Configuration

FIG. 1 is a block diagram showing an overall configuration of a control system 1 according to a first embodiment. The control system 1 includes one information processing device 10, a first projector 30A, and a second projector 30B. The information processing device 10, the first projector 30A, and the second projector 30B are communicably connected to each other via a communication network NET.

The information processing device 10 causes the first projector 30A to project a first projection image PI1 onto a projection target PO. The information processing device 10 causes the second projector 30B to project a second projection image PI2 onto the projection target PO. The projection target PO is a projection target having a three-dimensional shape for the first projection image PI1 and the second projection image PI2. The projection target PO is, for example, a wall or a screen. The information processing device 10 causes the first projector 30A to project the first projection image PI1 and causes the second projector 30B to project the second projection image PI2, and thus executes multi-projection. The multi-projection includes stacking and tiling.

The "stacking" is a technique in which the first projection image PI1 and the second projection image PI2 are superimposed on each other on the projection target PO and thus displayed as one image. The "stacking" includes "simple stacking". The "simple tacking" is a technique in which the first projection image PI1 and the second projection image PI2 are the same image and in which the first projection image PI1 and the second projection image PI2 are superimposed and projected at the same position to increase the brightness of a composite image TI of the first projection image PI1 and the second projection image PI2.

Meanwhile, the "tiling" is a technique in which the first projection image PI1 and the second projection image PI2 are displayed side by side on the projection target PO.

When executing multi-projection using the control system 1, the user of the control system 1 configures of the multi-projection, using the information processing device 10. A specific setting method will be described later.

The information processing device 10 is, for example, a smartphone. However, the information processing device 10 is not limited to a smartphone. For example, the information processing device 10 may be a tablet or a personal computer (PC). The information processing device 10 is an example of an "electronic device".

In FIG. 1, the control system 1 includes two projectors 30, that is, the first projector 30A and the second projector 30B. However, the control system 1 can include any number of projectors 30 that is equal to or greater than two. The information processing device 10 can execute multi-projection, using the any number of projectors 30. Hereinafter, for the sake of convenience of description, a case where the control system 1 includes two projectors 30, that is, the first projector 30A and the second projector 30B, will be described. However, the operation performed by the information processing device 10 when executing multi-projection using three or more projectors 30 is basically similar to the operation performed by the information processing device 10 when executing multi-projection using two projectors, that is, the first projector 30A and the second projector 30B, described below.

While the information processing device 10 adjusts the projection positions of the first projection image PI1 and the second projection image PI2 on the projection target PO, using a method described later, the first projection image PIL is preferably a white image displayed on the projection target PO as a result of white light being projected from the first projector 30A. Similarly, the second projection image PI2 is preferably a white image displayed on the projection target PO as a result of white light being projected from the second projector 30B.

1-1-2: Configuration of Information Processing Device

Figure 2:
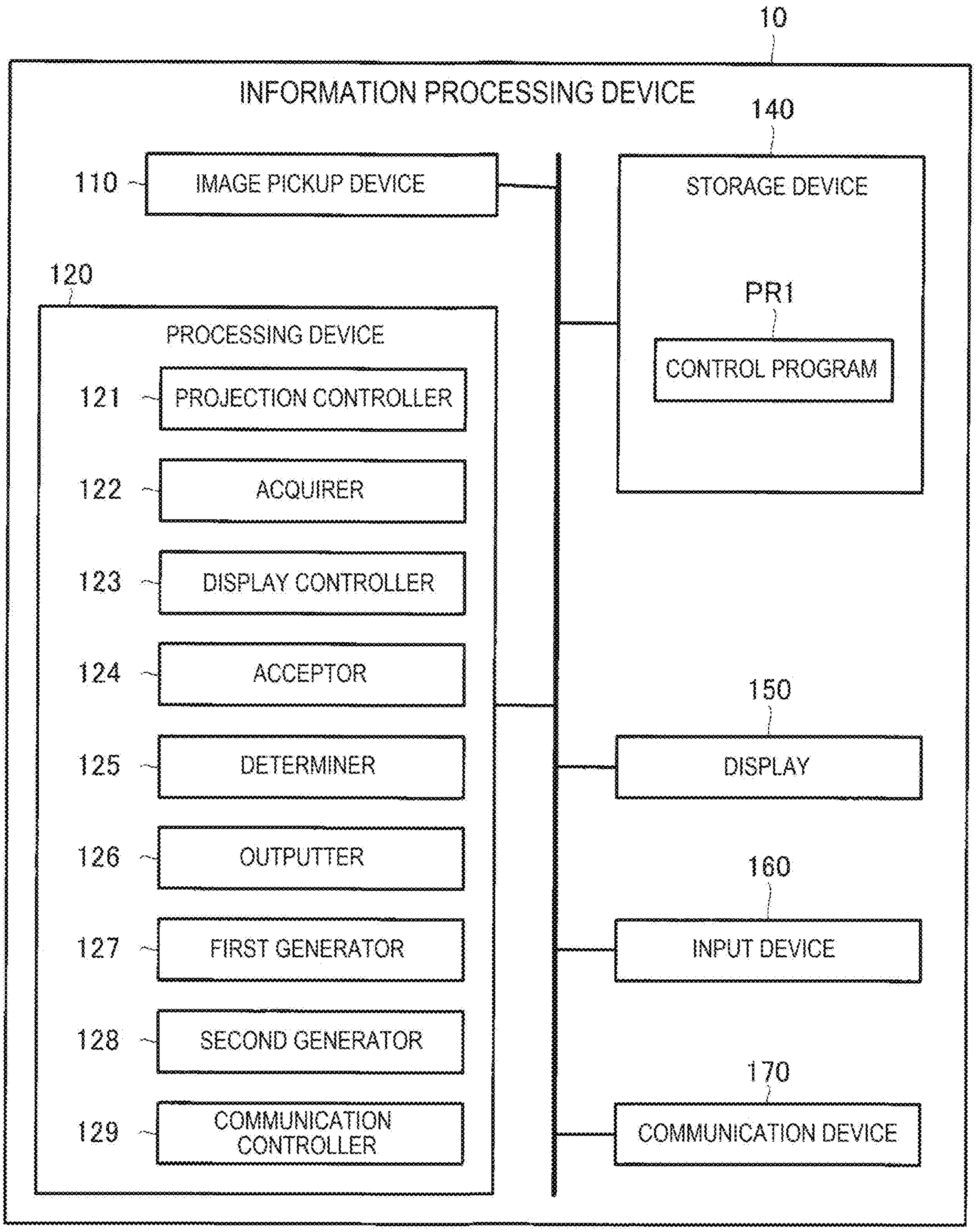
FIG. 2 is a block diagram showing an example of the configuration of an information processing device 10.

FIG. 2 is a block diagram showing an example of the configuration of the information processing device 10. The information processing device 10 includes an image pickup device 110, a processing device 120, a storage device 140, a display 150, an input device 160, and a communication device 170. The elements of the information processing device 10 are coupled to each other via a single bus or a plurality of buses for communicating information.

The image pickup device 110 is a device that picks up the first projection image PI1 and the second projection image PI2. In the present embodiment, as described later, the image pickup device 110 generates one picked-up image SI including both the first projection image PI1 and the second projection image PI2. The image pickup device 110 picks up various images under the control of the processing device 120. For example, a camera provided in a PC, a tablet terminal, or a smartphone is preferably used as the image pickup device 110, but this is not limiting. The image pickup device 110 may be an external camera such as a web camera.

In the description below, it is assumed that, when the image pickup device 110 generates the picked-up image SI, screen adjustment functions such as a screen enlargement/reduction function and a geometric correction function of the first projector 30A and the second projector 30B are initialized. However, as described later, the screen adjustment functions may not be initialized.

The processing device 120 is a processor that controls the entirety of the information processing device 10 and is configured with, for example, a single chip or a plurality of chips. The processing device 120 is configured with, for example, a central processing unit (CPU) including an interface with a peripheral device, an arithmetic device, and a register or the like. A part or all of the functions of the processing device 120 may be implemented by hardware such as a digital signal processor (DSP), an application-specific integrated circuit (ASIC), a programmable logic device (PLD), or a field-programmable gate array (FPGA). The processing device 120 executes various processing in parallel or in sequence.

The storage device 140 is a recording medium with which the processing device 120 can perform reading and writing, and stores a plurality of programs including a control program PR1 to be executed by the processing device 120. The storage device 140 may be configured with, for example, at least one of a read-only memory (ROM), an erasable programmable ROM (EPROM), an electrically erasable programmable ROM (EEPROM), a random-access memory (RAM), and the like. The storage device 140 may be referred to as a register, a cache, a main memory, or a main storage device or the like.

The display 150 is a device that displays an image and character information. The display 150 displays various images under the control of the processing device 120. For example, various display panels such as a liquid crystal display panel and an organic electroluminescence (EL) display panel are suitably used as the display 150.

The input device 160 is a device that accepts an operation from the user of the control system 1. For example, the input device 160 includes a pointing device such as a keyboard, a touch pad, a touch panel, or a mouse. When the input device 160 includes a touch panel, the input device 160 may also serve as the display 150.

In the description below, it is assumed that the input device 160 includes a touch panel and also serves as the display 150, but the configuration in the present embodiment is not limited to this.

The communication device 170 is hardware serving as a transmitting and receiving device for communicating with other devices. The communication device 170 is also referred to as, for example, a network device, a network controller, a network card, or a communication module or the like. The communication device 170 includes a wireless communication interface. An example of the wireless communication interface may be an interface conforming to a wireless LAN and Bluetooth (registered trademark) or the like. The communication device 170 may include a connector for wired connection and may include an interface circuit corresponding to the connector. An example of the connector for wired connection and the interface circuit may be those conforming to a wired LAN, IEEE1394, and USB.

The processing device 120 reads and executes the control program PR1 from the storage device 140 and thus functions as a projection controller 121, an acquirer 122, a display controller 123, an acceptor 124, a determiner 125, an outputter 126, a first generator 127, a second generator 128, and a communication controller 129. The control program PR1 may be transmitted from another device such as a server that manages the information processing device 10, via the communication network NET.

The projection controller 121 causes the first projector 30A to project the first projection image PI1. The projection controller 121 causes the second projector 30B to project the second projection image PI2.

Figure 3:
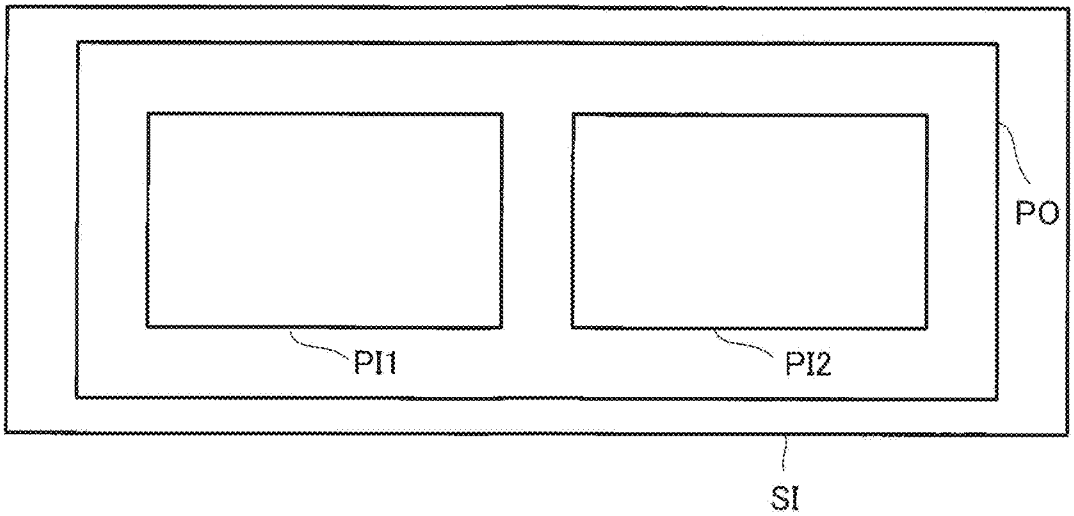
FIG. 3 shows an example of a picked-up image SI acquired by an acquirer 122 from an image pickup device 110.

The acquirer 122 causes the image pickup device 110 to generate the picked-up image SI and acquires the picked-up image SI from the image pickup device 110. FIG. 3 shows an example of the picked-up image SI acquired by the acquirer 122 from the image pickup device 110. As illustrated in FIG. 3, the picked-up image SI includes the first projection image PI1 and the second projection image PI2 on the projection target PO.

For the sake of convenience of description, in the description below, it is assumed that the information processing device 10, the first projector 30A, and the second projector 30B face directly in front of the projection target PO such as a wall or a screen, and that the first projector 30A and the second projector 30B are installed side by side in the horizontal direction in relation to the projection target PO. In the description below, it is also assumed that the first projector 30A and the second projector 30B project the first projection image PI1 and the second projection image PI2 onto the projection target PO at the same magnification ratio. Therefore, in FIG. 3, the first projection image PI1 and the second projection image PI2 have the same rectangular shape arranged in the horizontal direction. However, as described later, at least one of the information processing device 10, the first projector 30A, and the second projector 30B may not face directly in front of the projection target PO. Thus, the shape of the first projection image PI1 and the second projection image PI2 may be a quadrilateral other than a rectangle.

In FIG. 2, the display controller 123 causes the display 150 to display various images and character information.

The acceptor 124 accepts an operation performed on the input device 160 by the user of the information processing device 10. In the present embodiment, as an example, the input device 160 includes the touch panel and also serves as the display 150, as described above. Therefore, the acceptor 124 accepts an operation performed by the user on the display 150 with the touch panel stacked thereon.

FIGS. 4 to 11 show an example of a display screen DI which the display controller 123 causes the display 150 to display, and the operation accepted by the acceptor 124.

Figure 4:
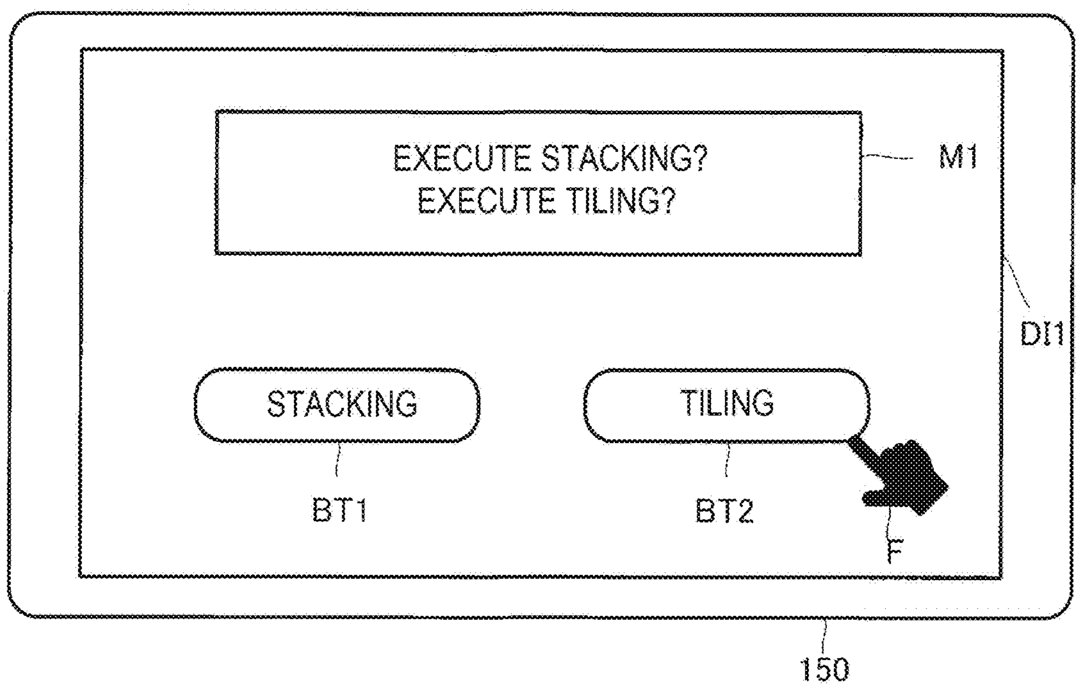
FIG. 4 shows an example of a display screen DI which a display controller 123 causes a display 150 to display and an operation accepted by an acceptor 124.

As an example, the display controller 123 causes the display 150 to display a first display screen DI1 illustrated in FIG. 4. The first display screen DI1 includes a first message M1, a first button BT1, and a second button BT2. The first message M1 includes a message for asking the user which of stacking and tiling to execute as multi-projection. The first message M1 is a message output on the first display screen DI1 by the outputter 126, described later. The first button BT1 is a button for the user to select stacking as a response to the first message M1. The second button BT2 is a button for the user to select tiling as a response to the first message M1.

The acceptor 124 accepts one of an operation indicating the selection of stacking and an operation indicating the selection of tiling, based on a touch on the first button BT1 or the second button BT2 with an indicator F indicating the first button BT1 or the second button BT2, such as a finger of the user.

Figure 5:
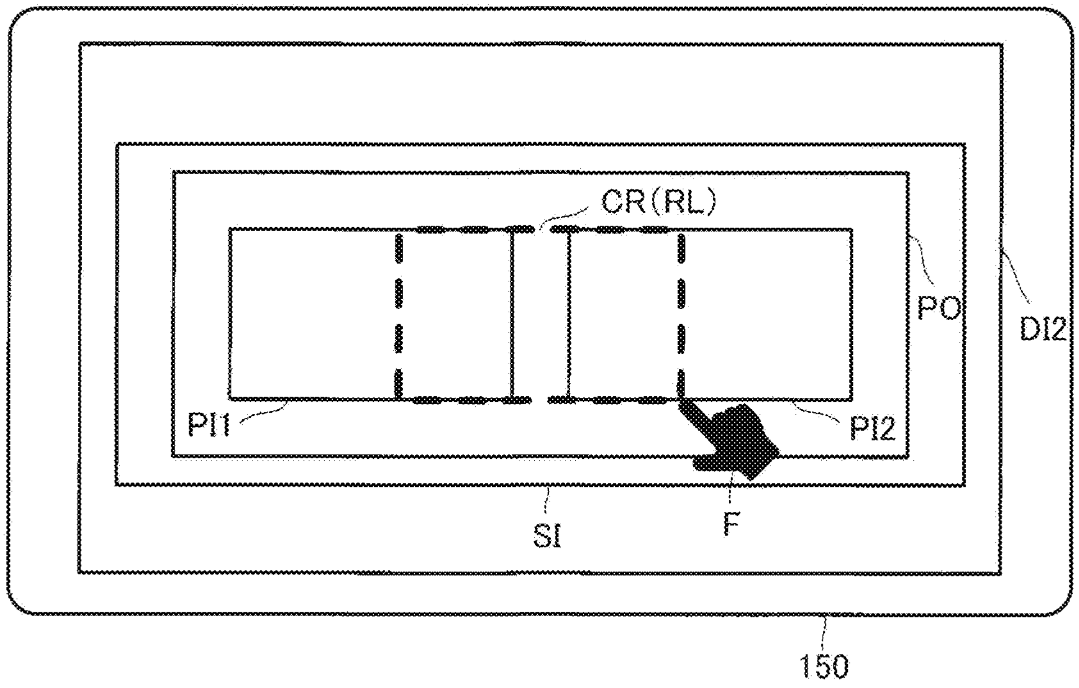
FIG. 5 shows an example of the display screen DI which the display controller 123 causes the display 150 to display and the operation accepted by the acceptor 124.

When the user touches the first button BT1 or the second button BT2, the display controller 123 causes the display 150 to display, for example, a second display screen DI2 illustrated in FIG. 5.

The second display screen DI2 includes the picked-up image SI. As described above, the picked-up image SI includes the first projection image PI1 and the second projection image PI2. The user performs a swipe with the indicator F on the second display screen DI2 so as to surround a region CR where the composite image TI formed by combining the first projection image PI1 and the second projection image PI2 is to be projected, on the projection target PO. The trajectory of the swipe is a frame line RL shown in FIG. 5. The frame line RL includes at least one of a straight line and a curved line. The acceptor 124 accepts an operation based on the swipe indicating the frame line RL performed on the display 150 by the user.

In FIG. 2, the determiner 125 determines whether the operation accepted from the user by the acceptor 124 is an appropriate input.

The outputter 126 outputs a message M for the user to the display 150 according to the result of the determination by the determiner 125.

Figure 6:
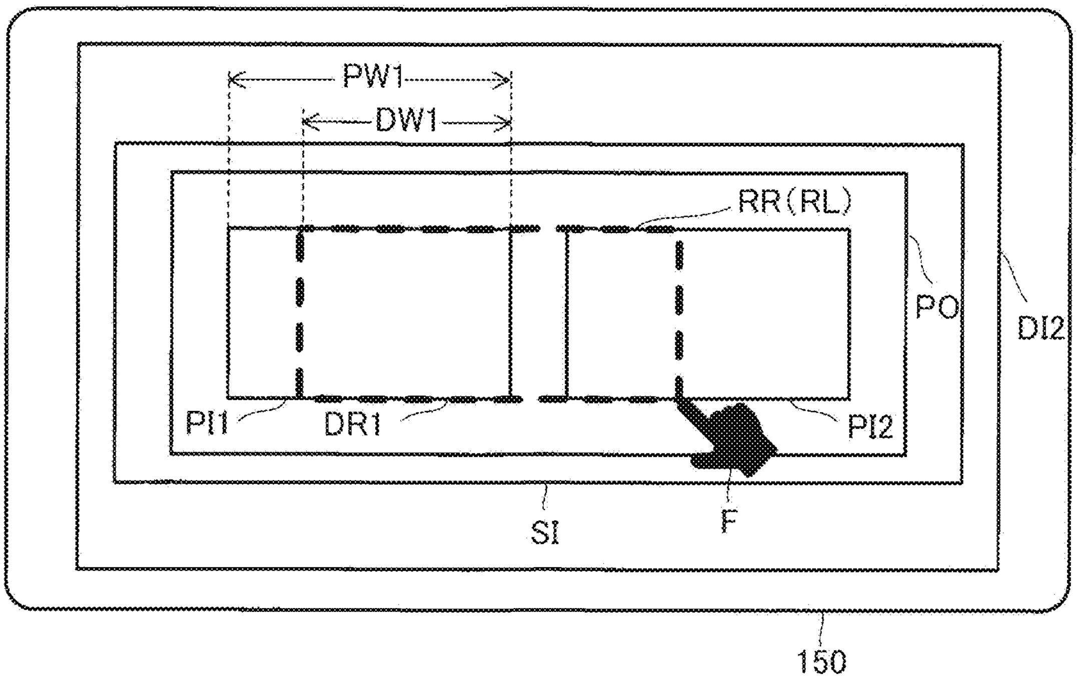
FIG. 6 shows an example of the display screen DI which the display controller 123 causes the display 150 to display and the operation accepted by the acceptor 124.
Figure 7:
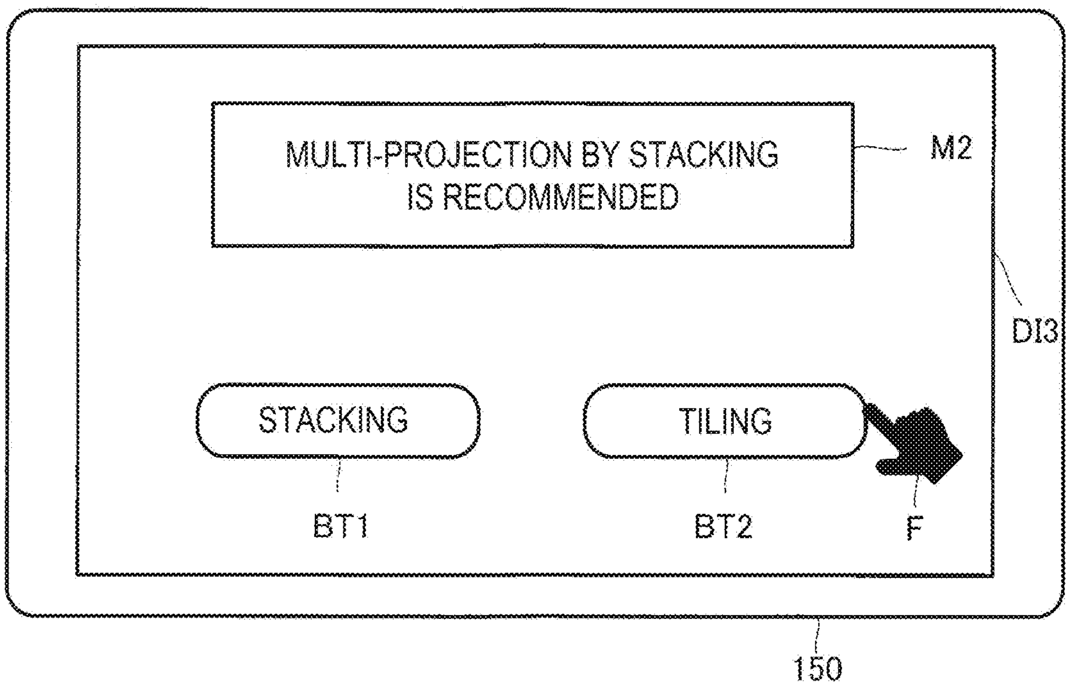
FIG. 7 shows an example of the display screen DI which the display controller 123 causes the display 150 to display and the operation accepted by the acceptor 124.

FIG. 6 shows a first example of the operation indicating the frame line RL accepted by the acceptor 124. FIG. 7 shows an example of a third display screen DI3 which the display controller 123 causes the display 150 to display.

In FIG. 6, an overlap region between a region RR surrounded by the frame line RL and the region of the first projection image PI1 is referred to as an overlap region DR1. The determiner 125 calculates the ratio of an overlap width DW1 of the overlap region DR1 to a horizontal width PW1 of the region of first projection image PI1. When the acceptor 124 accepts the operation by the user selecting the second button BT2 in the first display screen DI1 illustrated in FIG. 4 and the ratio of the overlap width DW1 to the horizontal width PW1 is equal to or higher than a first value in the second display screen DI2 illustrated in FIG. 6, the determiner 125 determines that the operation accepted by the acceptor 124 is abnormal. The first value is 70% as an example.

In this case, the display controller 123 causes the third display screen DI3 illustrated in FIG. 7 to be displayed. The third display screen DI3 includes a second message M2, a first button BT1, and a second button BT2. The second message M2 is a message that the outputter 126 outputs on the third display screen DI3, and includes a message that recommends multi-projection based on stacking to the user. Similarly to the first button BT1 displayed on the first display screen DI1, the first button BT1 is a button for the user to select stacking as a response to the second message M2. Similarly to the second button BT2 on the first display screen DI1, the second button BT2 is a button for the user to select tiling as response to the second message M2. When the user touches the first button BT1 or the second button BT2 with the indicator F such as a finger, the display controller 123 causes the display 150 to display the second display screen DI2, as in the foregoing case.

After the user touches the second button BT2 as a response to the first message M1, when the ratio of the overlap width DW1 to the horizontal width PW1 becomes equal to or higher than the first value again on the second display screen DI2 illustrated in FIG. 6, the display controller 123 may not cause the display 150 to display the third display screen DI3 again. For example, the display controller 123 may cause a part of first projection image PI1 and a part of second projection image PI2 to be displayed side by side within the range of region RR.

Figure 8:
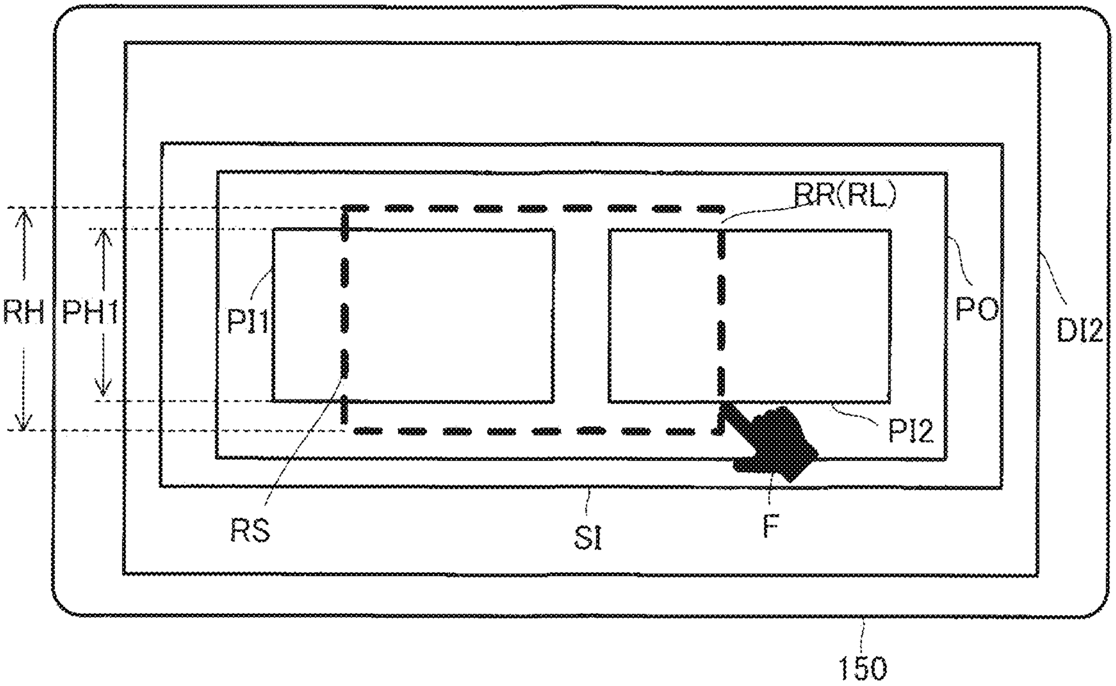
FIG. 8 shows an example of the display screen DI which the display controller 123 causes the display 150 to display and the operation accepted by the acceptor 124.
Figure 9:
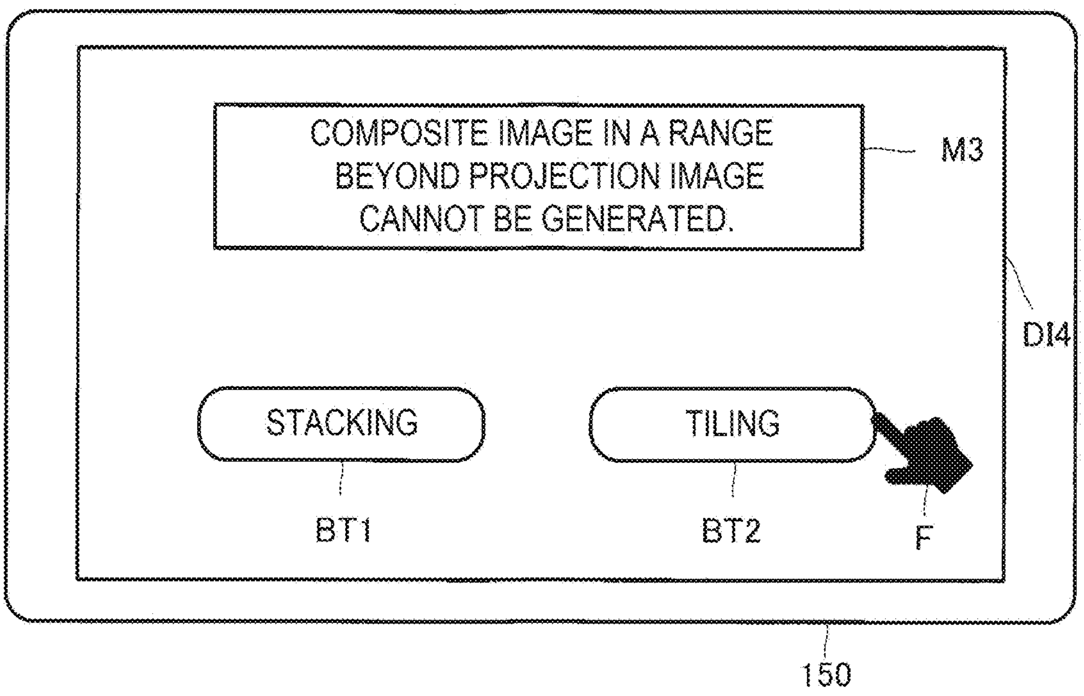
FIG. 9 shows an example of the display screen DI which the display controller 123 causes the display 150 to display and the operation accepted by the acceptor 124.

FIG. 8 shows a second example of the operation indicating the frame line RL accepted by the acceptor 124. FIG. 9 shows an example of a fourth display screen DI4 which the display controller 123 causes the display 150 to display.

In FIG. 8, the determiner 125 determines the positional relationship between a vertical width PH1 of the first projection image PI1 and a vertical width RH of the region RR surrounded by the frame line RL. As illustrated in FIG. 8, for example, when a side RS of the region RR extends beyond the vertical width PH1 of the first projection image PI1, the determiner 125 determines that the operation accepted by the acceptor 124 is abnormal.

More specifically, when at least one end point of the two ends of the side RS is located outside the region RR and the distance between the end point and the region RR is longer than a predetermined value that is set in advance, the determiner 125 determines that the operation accepted by the acceptor 124 is abnormal.

In this case, the display controller 123 causes a fourth display screen DI4 illustrated in FIG. 9 to be displayed. The fourth display screen DI4 includes a third message M3, a first button BT1, and a second button BT2. The third message M3 is a message that the outputter 126 outputs on the fourth display screen DI4. The third message M3 includes a message notifying the user that the composite image TI extending beyond the range of the first projection image PI1 cannot be generated. Similarly to the first button BT1 displayed on the first display screen DI1, the first button BT1 is a button for the user to select stacking as a response to the third message M3. Similarly to the second button BT2 displayed on the first display screen DI1, the second button BT2 is a button for the user to select tiling as response to the third message M3. When the user touches the first button BT1 or the second button BT2 with the indicator F such as a finger, the display controller 123 causes the display 150 to display the second display screen DI2, as in the foregoing case.

In the above description, the result of the determination by the determiner 125 based on the comparison between the region of the first projection image PI1 and the frame line RL or the region RR surrounded by the frame line RL is described. The same applies to the result of the determination result by the determiner 125 based on the comparison between the region of the second projection image PI2 and the frame line RL or the region RR surrounded by the frame line RL. That is, when the side RS of the region RR extends beyond at least one of the vertical width PH1 of the first projection image PI1 and the vertical width of the second projection image PI2, the determiner 125 may determine that the operation accepted by the acceptor 124 is abnormal.

In FIG. 2, when the operation accepted by the acceptor 124 is normal, the first generator 127 generates first information AI1, based on the operation accepted by the acceptor 124. The first information AI1 includes at least one first adjustment amount AA1 related to the first projection image PI1 necessary for forming the composite image TI.

Figure 10:
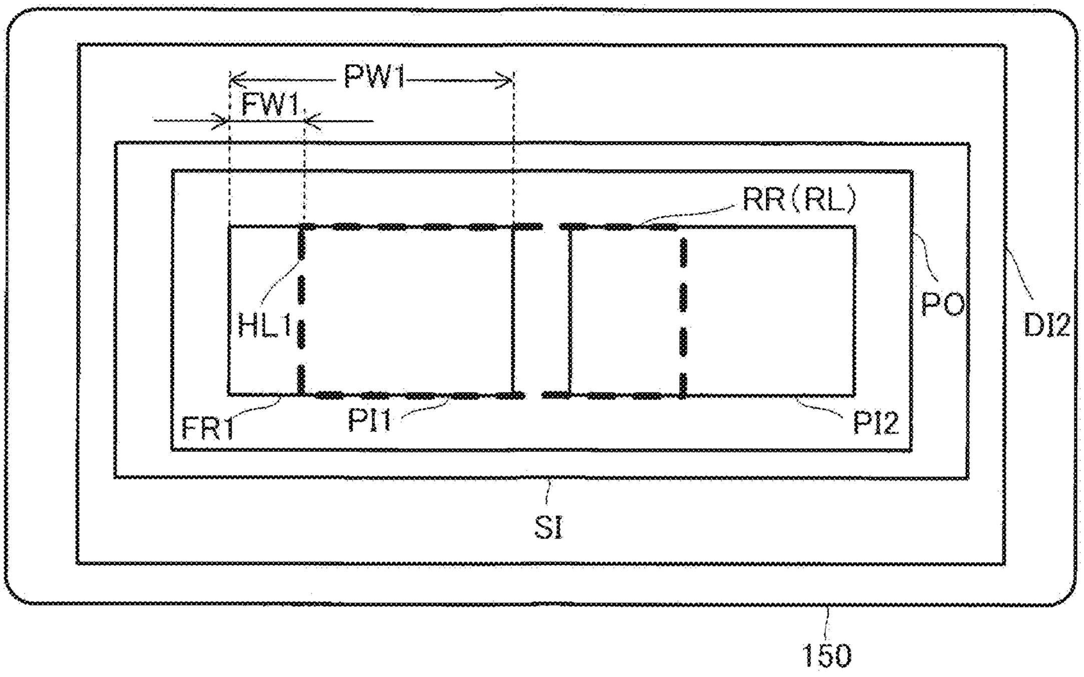
FIG. 10 shows an example of the display screen DI which the display controller 123 causes the display 150 to display and the operation accepted by the acceptor 124.

FIG. 10 illustrates a method of calculating the first adjustment amount AA1 by the first generator 127. The first generator 127 detects the outer frame of the first projection image PI1 on the second display screen DI2 displayed on the display 150. Next, the first generator 127 detects the horizontal width PW1 of the first projection image PI1 on the second display screen DI2, based on the resolution of the picked-up image SI arranged in the second display screen DI2. Next, the first generator 127 detects a vertical frame HL1 of the region RR, and detects a horizontal width FW1 of a region FR1 where the region of the first projection image PI1 and the region RR do not overlap each other. The first generator 127 calculates the ratio of the horizontal width FW1 of the region FR1 to the horizontal width PW1 of the first projection image PIL as the first adjustment amount AA1. Specifically, the first generator 127 divides the numerical value of the horizontal width FW1 on the second display screen DI2 by the numerical value of the horizontal width PW1 on the second display screen DI2 and thus calculates the first adjustment amount AA1.

In FIG. 2, when the operation accepted by the acceptor 124 is normal, the second generator 128 generates second information AI2, based on the operation accepted by the acceptor 124.

The second information AI2 includes at least one second adjustment amount AA2 related to the second projection image PI2 necessary for forming the composite image TI.

Figure 11:
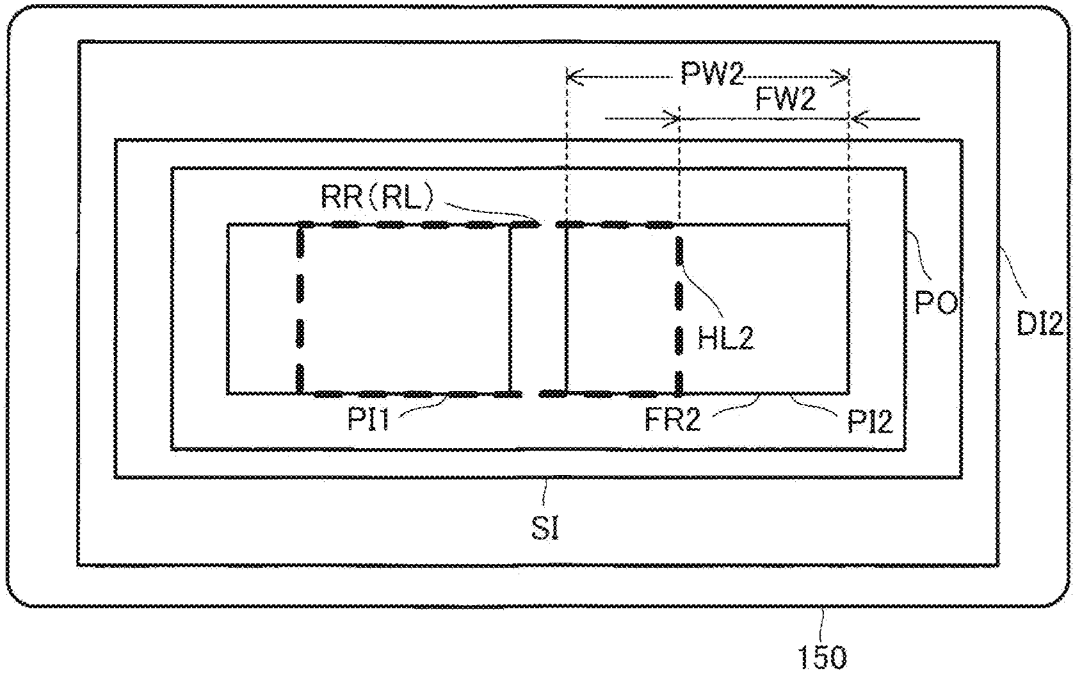
FIG. 11 shows an example of the display screen DI which the display controller 123 causes the display 150 to display and the operation accepted by the acceptor 124.

FIG. 11 illustrates a method of calculating the second adjustment amount AA2 by the second generator 128. The second generator 128 detects an outer frame of the second projection image PI2 on the second display screen DI2 displayed on the display 150. Next, the second generator 128 detects a horizontal width PW2 of the second projection image PI2 on the second display screen DI2, based on the resolution of the picked-up image SI arranged in the second display screen DI2. Next, the second generator 128 detects a vertical frame HL2 of the region RR, and detects a horizontal width FW2 of a region FR2 where the region of the second projection image PI2 and the region RR do not overlap each other. The second generator 128 calculates the ratio of the horizontal width FW2 of the region FR2 to the horizontal width PW2 of the region RR as the second adjustment amount AA2. Specifically, the second generator 128 divides the numerical value of the horizontal width FW2 on the second display screen DI2 by the numerical value of the horizontal width PW2 on the second display screen DI2 and thus calculates the second adjustment amount AA2. The unit of each of the perimeter length of the frame line RL, the horizontal width FW1, the horizontal width PW1, the horizontal width FW2, and the horizontal width PW2 is pixels. In the present embodiment, the resolution of the display 150 is the same as the resolution (the number of pixels) of the picked-up image SI, that is, the pixels of the display 150 correspond to the pixels of the picked-up image SI on a one-to-one basis. Thus, in the present embodiment, the numbers of pixels of the perimeter length of the frame line RL, the horizontal width FW1, the horizontal width PW1, the horizontal width FW2, and the horizontal width PW2 on the display 150 are the same as the numbers of pixels of the perimeter length of the frame line RL, the horizontal width FW1, the horizontal width PW1, the horizontal width FW2, and the horizontal width PW2 in the picked-up image SI. The resolution of the display 150 may not be the same as the resolution (the number of pixels) of the picked-up image SI. In this case, the correspondence relationship between the pixels of the display 150 and the pixels of the picked-up image SI may be stored in the storage device 140 in advance. The correspondence relationship implements transformation from one of the coordinate system of the display 150 and the coordinate system of the picked-up image SI to the other. Thus, the number of pixels on the display 150 is converted into the number of pixels in the picked-up image SI. The perimeter length of the frame line RL, the horizontal width FW1, the horizontal width PW1, the horizontal width FW2, and the horizontal width PW2 transformed into the coordinate system of the picked-up image SI, based on the correspondence relationship, may be used.

In FIG. 2, the communication controller 129 causes the communication device 170 to transmit the first information AI1 including the first adjustment amount AA1 generated by the first generator 127, to the first projector 30A. The communication controller 129 also causes the communication device 170 to transmit the second information AI2 including the second adjustment amount AA2 generated by the second generator 128, to the second projector 30B.

1-1-3: Configuration of Projector

Figure 12:
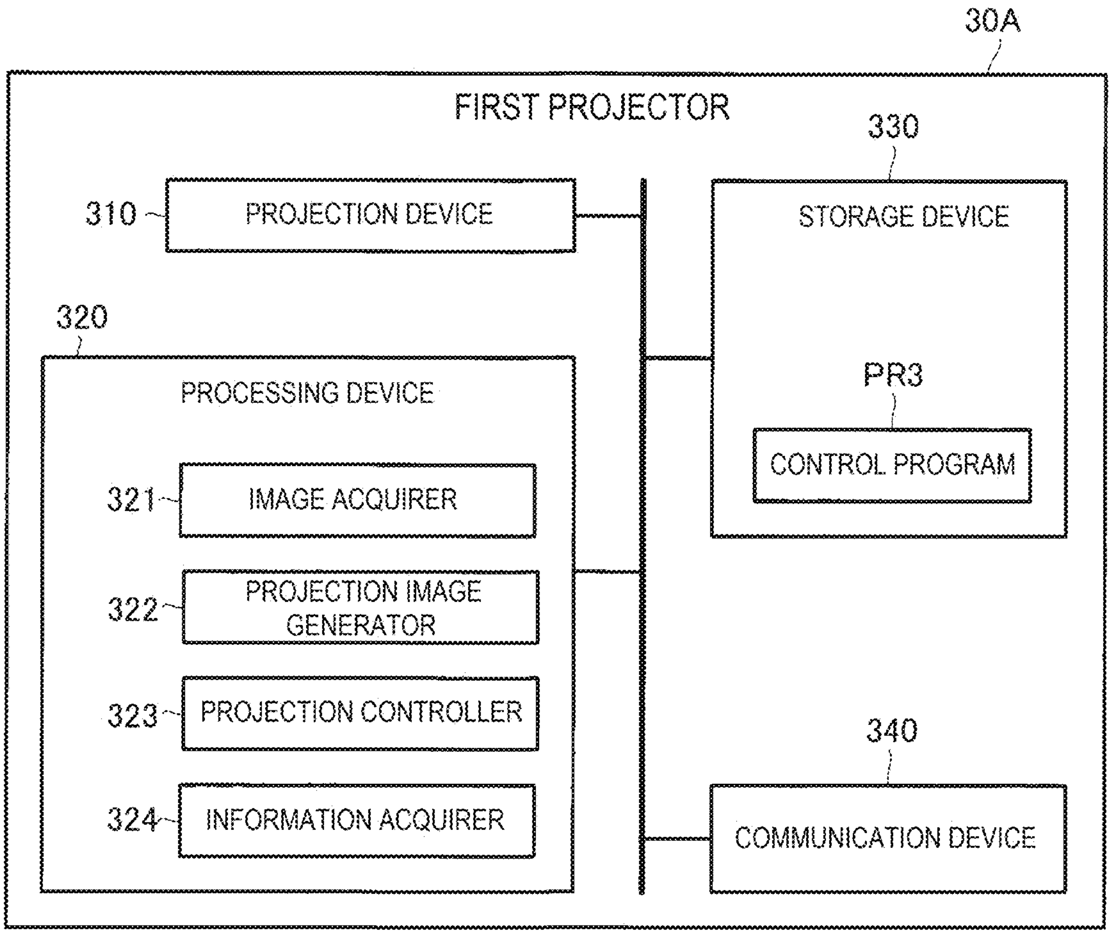
FIG. 12 is a block diagram showing the configuration of a first projector 30A.

FIG. 12 is a block diagram showing the configuration of the first projector 30A. The first projector 30A includes a projection device 310, a processing device 320, a storage device 330, and a communication device 340. The elements of the first projector 30A are coupled to each other via a single bus or a plurality of buses for communicating information. The elements of the first projector 30A may be configured with a single device or a plurality of devices, and a part of the elements of the first projector 30A may be omitted.

Since the second projector 30B is configured similarly to the first projector 30A, the illustration and description thereof are omitted.

The projection device 310 is a device that projects the first projection image PI1 generated by a projection image generator 322, described later, onto the projection target PO such as a screen or a wall. The projection device 310 projects various images under the control of the processing device 320. The projection device 310 includes, for example, a light source, a liquid crystal panel, and a projection lens, modulates light from the light source, using the liquid crystal panel, and projects the modulated light onto the projection target PO via the projection lens.

The processing device 320 is a processor that controls the entirety of the first projector 30A, and is configured with, for example, a single chip or a plurality of chips. The processing device 320 is configured with, for example, a central processing unit (CPU) including an interface with a peripheral device, an arithmetic device, and a register or the like. A part or all of the functions of the processing device 320 may be implemented by hardware such as a digital signal processor (DSP), an application-specific integrated circuit (ASIC), a programmable logic device (PLD), or a field-programmable gate array (FPGA). The processing device 320 executes various processing in parallel or in sequence.

The storage device 330 is a recording medium readable by the processing device 320 and stores a plurality of programs including a control program PR3 to be executed by the processing device 320. The storage device 330 may be configured with, for example, at least one of a read-only memory (ROM), an erasable programmable ROM (EPROM), an electrically erasable programmable ROM (EEPROM), a random-access memory (RAM), and the like. The storage device 330 may be referred to as a register, a cache, a main memory, a main storage device, or the like.

The storage device 330 may store an original image RI1 that is the source of the first projection image PI1 to be projected by the first projector 30A.

The communication device 340 is hardware serving as a transmitting and receiving device for communicating with other devices. The communication device 340 is also referred to as, for example, a network device, a network controller, a network card, or a communication module or the like. The communication device 340 includes a wireless communication interface. An example of the wireless communication interface may be an interface conforming to a wireless LAN and Bluetooth (registered trademark) or the like. The communication device 340 may include a connector for wired connection and may include an interface circuit corresponding to the connector. An example of the connector for wired connection and the interface circuit may be those conforming to a wired LAN, IEEE1394, and USB.

The processing device 320 reads and executes the control program PR3 from the storage device 330 and thus functions as an image acquirer 321, a projection image generator 322, a projection controller 323, and an information acquirer 324.

The control program PR3 may be transmitted from another device such as a server that manages the first projector 30A, via the communication network NET.

The image acquirer 321 acquires an original image RI1 that is a source of the first projection image PI1 projected by the first projector 30A. The image acquirer 321 may acquire the original image RI1 from the storage device 330. Alternatively, the image acquirer 321 may acquire the original image RI1 from the information processing device 10 via the communication device 340.

The projection image generator 322 generates the first projection image PI1, using the original image RI1 acquired by the image acquirer 321. As an example, the projection image generator 322 performs geometric correction on the original image RI1 and thus generates the first projection image PI1. As described above, in the description below, it is assumed that the screen adjustment function such as the geometric correction function by the projection image generator 322 is initialized when the image pickup device 110 of the information processing device 10 generates the picked-up image SI.

The projection controller 323 causes the projection device 310 to project the first projection image PI1 generated by the projection image generator 322 onto the projection target PO. As described above, in the description below, it is assumed that the screen adjustment function such as the enlargement/reduction function by the projection controller 323 is initialized when the image pickup device 110 of the information processing device 10 generates the picked-up image SI.

The information acquirer 324 acquires the first information AI1 including the first adjustment amount AA1 from the information processing device 10 via the communication device 340. As the information acquirer 324 acquires the first information AI1, the projection controller 323 adjusts the projection position of the first projection image PI1 in relation to the projection target PO, using the first adjustment amount AA1 included in the first information AI1.

More specifically, the projection controller 323 calculates the amount of movement of the projection position of the first projection image PIL in the horizontal direction in relation to the projection target PO, using the ratio of the horizontal width FW1 of the region FR1 to the horizontal width PW1 of the first projection image PI1 indicated by the first adjustment amount AA1. Specifically, the projection controller 323 multiplies the number of pixels corresponding to the length in the horizontal width direction of the liquid crystal panel provided in the projection device 310 by the above ratio and thus calculates the number of pixels corresponding to the amount of movement of the projection position of the first projection image PI1 in the lateral direction. For example, when the number of pixels corresponding to the length in the horizontal width direction of the liquid crystal panel is 1920 pixels and the ratio is 0.3, the projection controller 323 calculates 1920×0.3=576 pixels as the amount of movement of the projection position of the first projection image PI1 in the lateral direction.

The projection controller 323 moves the projection position of the first projection image PI1 in the horizontal direction in relation to the projection target PO by the calculated amount of movement. In the example illustrated in FIG. 10, the projection controller 323 moves the projection position of the first projection image PI1 to the right by the calculated amount of movement.

When the amount of movement calculated by the projection controller 323 exceeds the movement range of the first projection image PI1, the projection controller 323 may cause the projection device 310 to project the projection image PI including an error message notifying that the adjustment cannot be performed, onto the projection target PO. In this case, the processing device 320 may cause the information processing device 10 to transmit information including the error message to the communication device 340, and the information processing device 10 may cause the display 150 to display the error message.

In the description related to the configuration of the first embodiment, it is assumed that the first projection image PI1 and the second projection image PI2 are arranged side by side in the horizontal direction on the projection target PO. However, the operation of each element when the positional relationship between the first projection image PI1 and the second projection image PI2 on the projection target PO is different from this example is the same as described above. For example, the first projection image PI1 and the second projection image PI2 may be arranged side by side in the vertical direction.

1-2: Operation of First Embodiment

Figure 13:
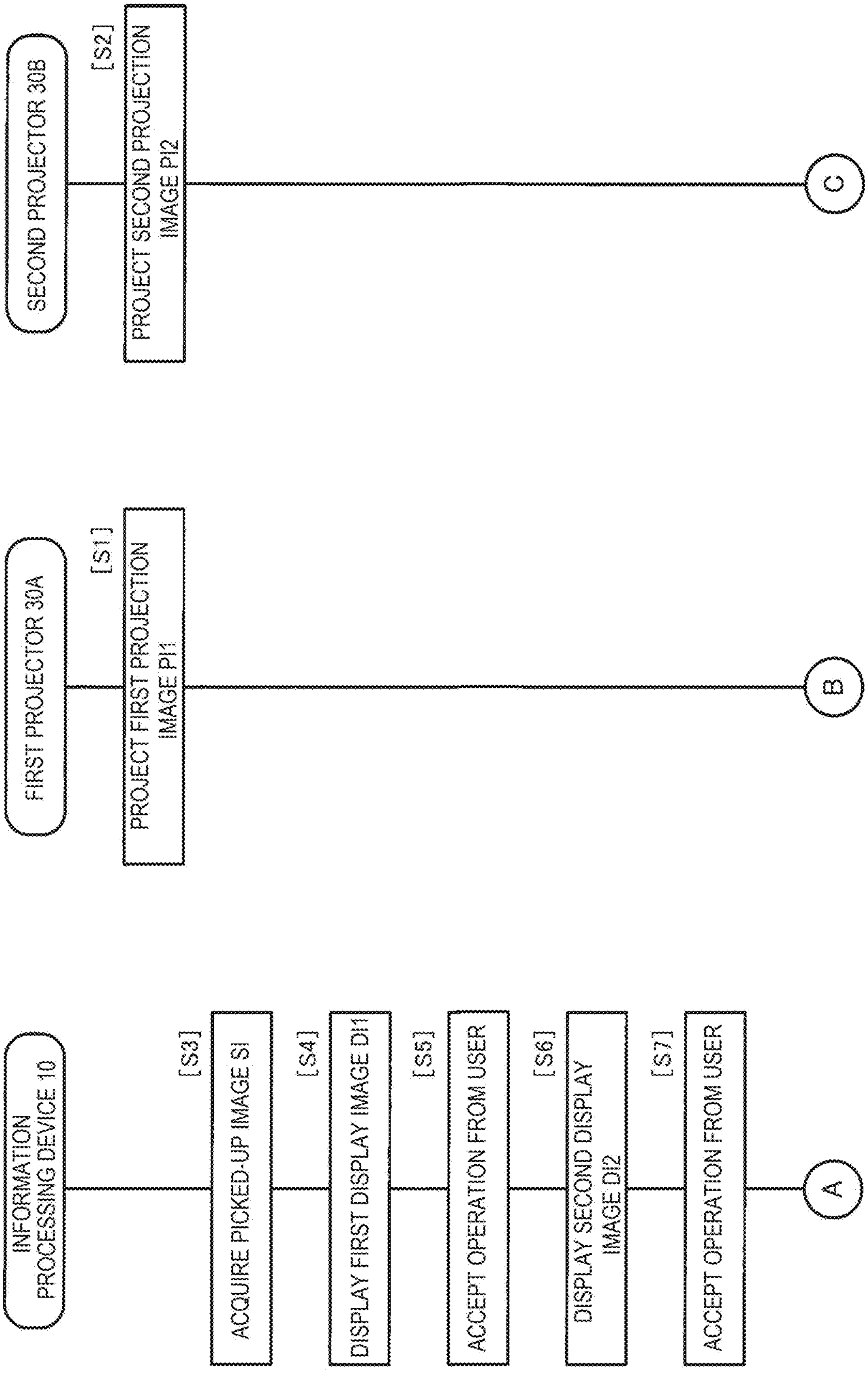
FIG. 13 is a sequence diagram illustrating a basic operation of the control system 1 according to the first embodiment.
Figure 14:
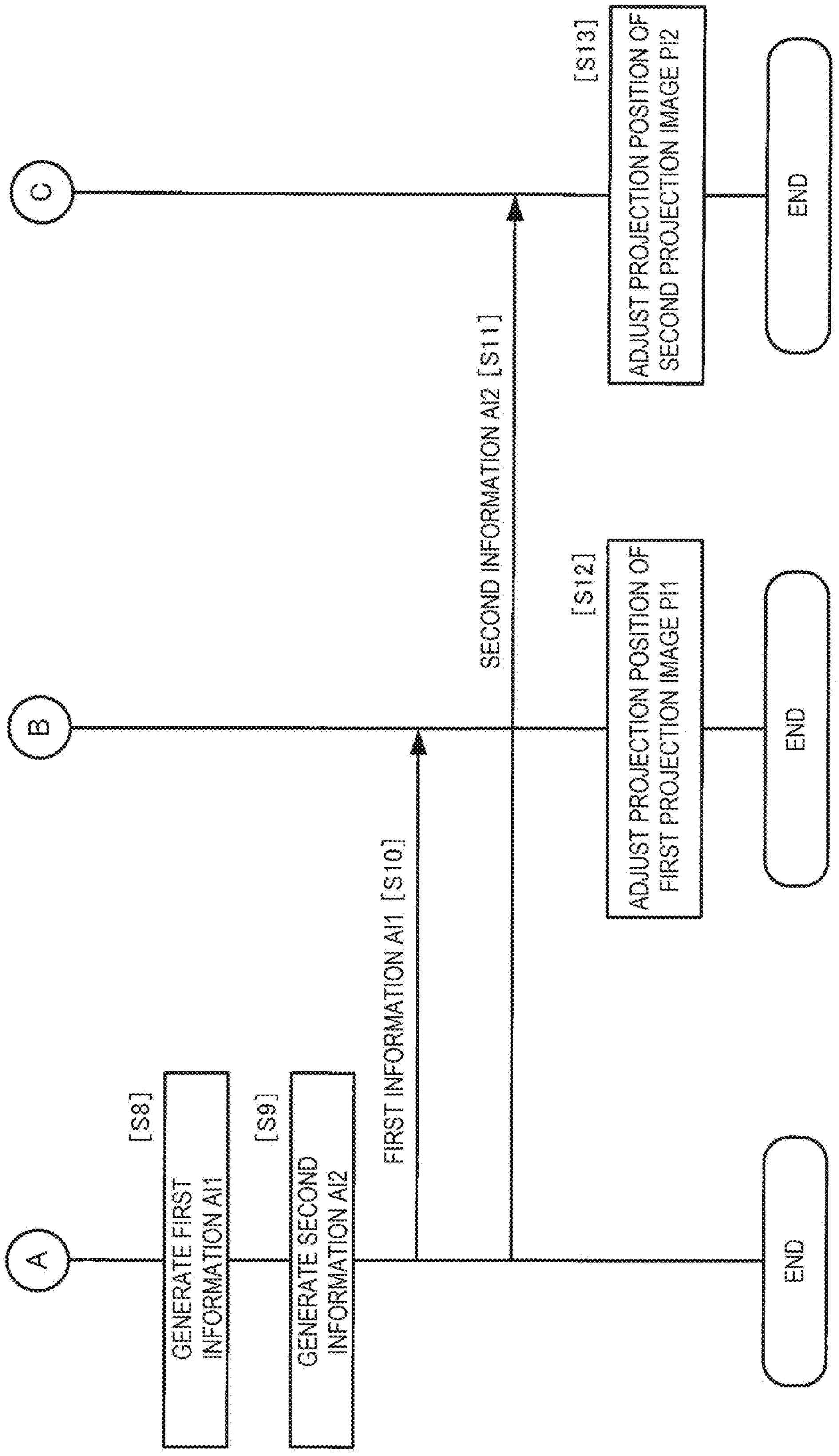
FIG. 14 is a sequence diagram illustrating a basic operation of the control system 1 according to the first embodiment.

FIGS. 13 and 14 are sequence diagrams illustrating basic operations of the control system 1 according to the first embodiment. In the description below, in order to simplify the description, the description of the operation as the determiner 125 by the processing device 120 provided in the information processing device 10 and the operation based on the result of the determination by the operation as the determiner 125 will be omitted.

In step S1, the processing device 320 provided in the first projector 30A functions as the projection controller 323. The processing device 320 causes the projection device 310 to project the first projection image PI1 onto the projection target PO.

In step S2, the processing device 320 provided in the second projector 30B functions as the projection controller 323. The processing device 320 causes the projection device 310 to project the second projection image PI2 onto the projection target PO.

The projection of the first projection image PI1 from the first projector 30A in step S1 may be executed by the first projector 30A being controlled by the information processing device 10. Alternatively, the projection may be executed by the first projector 30A being controlled by a control device other than the information processing device 10. Similarly, the projection of the second projection image PI2 from the second projector 30B in step S2 may be executed by the second projector 30B being controlled by the information processing device 10. Alternatively, the projection may be performed by the second projector 30B being controlled by a control device other than the information processing device 10.

In step S3, the processing device 120 provided in the information processing device 10 functions as the acquirer 122. The processing device 120 causes the image pickup device 110 to generate the picked-up image SI and acquires the picked-up image SI from the image pickup device 110. The picked-up image SI includes the first projection image PI1 and the second projection image PI2 on the projection target PO.

In step S4, the processing device 120 provided in the information processing device 10 functions as the display controller 123. The processing device 120 causes the display 150 to display the first display screen DI1. The first display screen DI1 includes the first message M1, the first button BT1, and the second button BT2.

In step S5, the processing device 120 provided in the information processing device 10 functions as the acceptor 124. The processing device 120 accepts one of an operation indicating the selection of stacking and an operation indicating the selection of tiling, based on a touch on the first button BT1 or the second button BT2 by the indicator F indicating the first button BT1 or the second button BT2, such as a finger of the user.

In step S6, the processing device 120 provided in the information processing device 10 functions as the display controller 123. The processing device 120 causes the display 150 to display the second display screen DI2. The second display screen DI2 includes the picked-up image SI.

In step S7, the processing device 120 provided in the information processing device 10 functions as the acceptor 124. The user performs a swipe with the indicator F on the second display screen DI2 so as to surround the region CR of the composite image TI made up of the first projection image PI1 and the second projection image PI2, on the projection target PO. The processing device 120 accepts the swipe indicating the frame line RL performed on the display 150 by the user.

In step S8, the processing device 120 provided in the information processing device 10 functions as the first generator 127. When the operation accepted in steps S5 and S6 is normal, the processing device 120 generates the first information AI1, based on the operation. The first information AI1 includes at least one first adjustment amount AA1 related to the first projection image PI1 necessary for forming the composite image TI.

In step S9, the processing device 120 provided in the information processing device 10 functions as the second generator 128. When the operation accepted in steps S5 and S6 is normal, the processing device 120 generates the second information AI2, based on the operation. The second information AI2 includes at least one second adjustment amount AA2 related to the second projection image PI2 necessary for forming the composite image TI.

In step S10, the processing device 120 provided in the information processing device 10 functions as the communication controller 129. The processing device 120 causes the communication device 170 to transmit the first information AI1 generated in step S8 to the first projector 30A.

The processing device 320 provided in the first projector 30A functions as the information acquirer 324. The processing device 320 causes the communication device 340 to receive and acquire the first information AI1 from the information processing device 10.

In step S11, the processing device 120 provided in the information processing device 10 functions as the communication controller 129. The processing device 120 causes the communication device 170 to transmit the second information AI2 generated in step S9 to the second projector 30B.

The processing device 320 provided in the second projector 30B functions as the information acquirer 324. The processing device 320 causes the communication device 340 to receive and acquire the second information AI2 from the information processing device 10.

In step S12, the processing device 320 provided in the first projector 30A functions as the projection controller 323. The processing device 320 calculates the amount of movement of the projection position of the first projection image PI1 in the horizontal direction in relation to the projection target PO, using the ratio of the horizontal width FW1 of the region FR1 to the horizontal width PW1 of the region of the first projection image PI1 indicated by the first adjustment amount AA1. The processing device 320 moves the projection position of the first projection image PIL in the horizontal direction in relation to the projection target PO by the calculated amount of movement.

In step S13, the processing device 320 provided in the second projector 30B functions as the projection controller 323. The processing device 320 calculates the amount of movement of the projection position of the second projection image PI2 in the horizontal direction in relation to the projection target PO, using the ratio of the horizontal width FW2 of the region FR2 to the horizontal width PW2 of the region of the second projection image PI2 indicated by the second adjustment amount AA2. The processing device 320 moves the projection position of the second projection image PI2 in the horizontal direction in relation to the projection target PO by the calculated amount of movement.

2: Modification Examples

The above embodiment can be modified in various manners. Specific aspects of modifications will be described below by way of example. The aspects described below by way of example and the aspects described in the above embodiment can be combined as appropriate within a range in which the aspects do not contradict each other. In the modification examples given below, elements having effects and functions equivalent to those in the embodiment are denoted by the reference numerals and signs used in the above description and detailed description of the elements is omitted as appropriate.

2-1: Modification Example 1

In the above embodiment, the information processing device 10 calculates the first adjustment amount AA1 and the second adjustment amount AA2. Then, the first projector 30A calculates the amount of movement of the first projection image PI1 on the projection target PO, using the first adjustment amount AA1, and the second projector 30B calculates the amount of movement of the second projection image PI2 on the projection target PO, using the second adjustment amount AA2. However, the first projector 30A may execute, for example, the method described below, and thus may independently calculate the amount of movement of the first projection image PI on the projection target PO without using the first adjustment amount AA1. Similarly, the second projector 30B may execute, for example, the method described below, and thus may independently calculate the amount of movement of the second projection image PI2 on the projection target PO without using the second adjustment amount AA2.

In this modification example, each of the first projector 30A and the second projector 30B includes a stereo camera.

Figure 15:
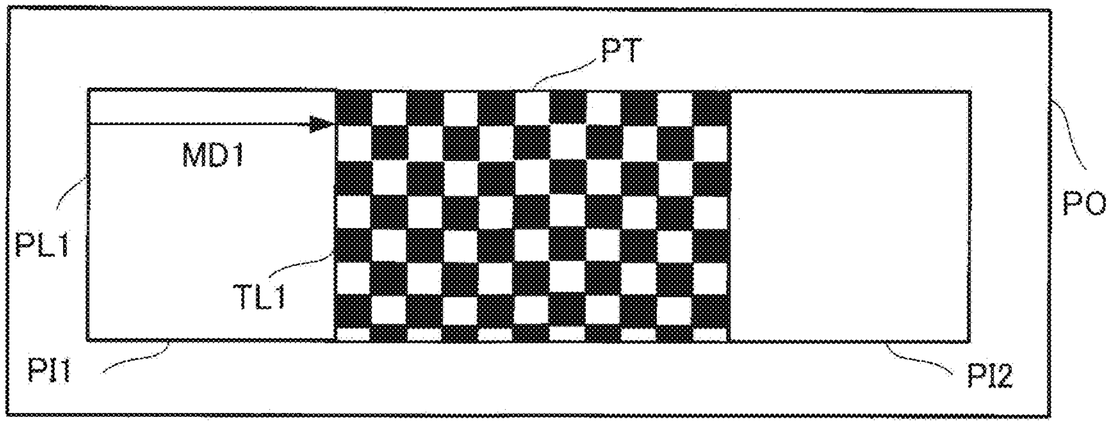
FIG. 15 shows an example of a pattern image PT.

First, the user of the control system 1 performs a swipe so as to surround the region CR of the composite image TI of the first projection image PI1 and the second projection image PI2 on the projection target PO with the frame line RL by a method similar to the method illustrated in FIG. 5. The information processing device 10 causes the first projector 30A or the second projector 30B to project a pattern image PT corresponding to the region CR onto the projection target PO. FIG. 15 shows an example of the pattern image PT.

The first projector 30A picks up, with the stereo camera, an image of the projection target PO on which the first projection image PI1, the second projection image PI2, and the pattern image PT are projected. The first projector 30A detects a side TL1 extending in the vertical direction of the pattern image PT and a side PL1 extending in the vertical direction of the first projection image PI1 from the picked-up image SI of the projection target PO. The first projector 30A calculates the difference between the position of the side TL1 in the horizontal direction and the position of the side PL1 in the horizontal direction as the amount of movement of the first projection image PI1 by triangulation.

The same applies to the second projector 30B.

2-2: Modification Example 2

In the above embodiment, it is assumed that all of the information processing device 10, the first projector 30A, and the second projector 30B face directly in front of the projection target PO. However, of these devices, the information processing device 10 may be positioned obliquely to the projection target PO.

Figure 16:
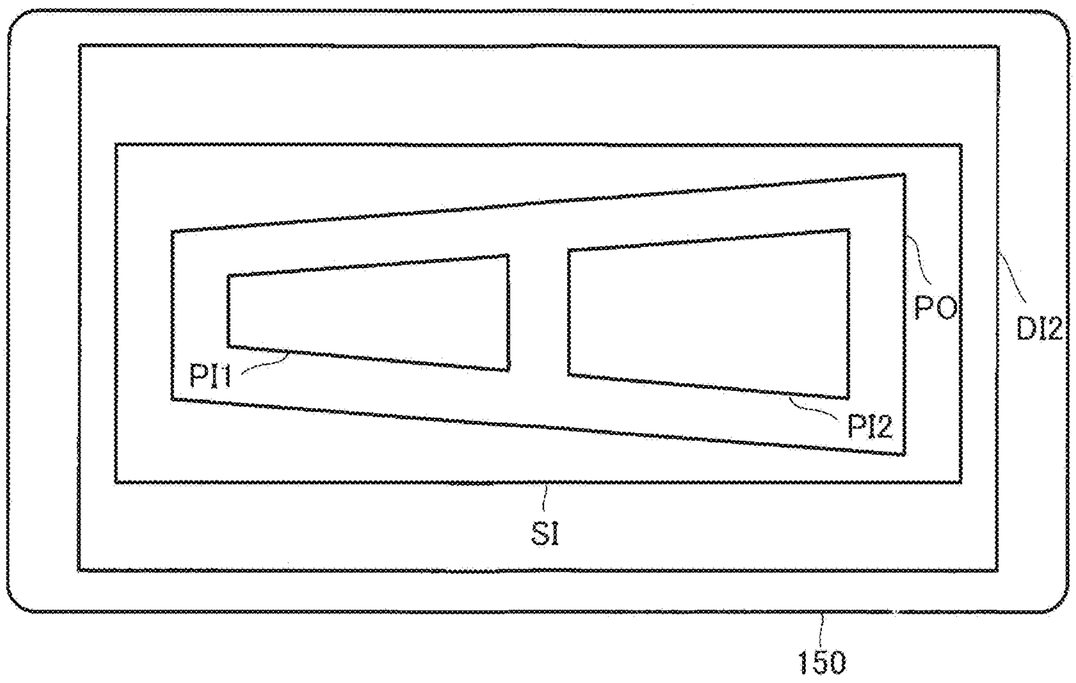
FIG. 16 shows an example of a second display screen DI2.

FIG. 16 is a diagram illustrating an example of the second display screen DI2 when the information processing device 10 is positioned obliquely to the projection target PO. As illustrated in FIG. 16, when the information processing device 10 is positioned obliquely to the projection target PO, the shapes of the first projection image PI1 and the second projection image PI2, along with the shape of the projection target PO, are distorted quadrilaterals that are different from a rectangle, on the display 150.

In this case, the information processing device 10 may perform projective transformation on the shapes of the first projection image PI1 and the second projection image PI2 to correct the shapes of the first projection image PI1 and the second projection image PI2 to the shapes as viewed in a plan view, and may then cause the display 150 to display the first projection image PI1 and the second projection image PI2. The same applies to the shape of the projection target PO.

In this case, the information processing device 10 may include a time-of-flight (ToF) sensor, generate a depth map of a projection surface on the projection target PO, based on measurement data acquired by the ToF sensor, and detect that the information processing device 10 is inclined in relation to the projection target PO, based on the depth map. Alternatively, the information processing device 10 may include an acceleration sensor and a gyro sensor, calculate attitude information indicating the attitude of the information processing device 10, based on measurement data acquired by the acceleration sensor and the gyro sensor, and detect that the information processing device 10 is inclined in relation to the projection target PO, based on the attitude information.

2-3: Modification Example 3

In the above embodiment, it is assumed that all of the information processing device 10, the first projector 30A, and the second projector 30B face directly in front of the projection target PO. However, at least one of the first projector 30A and the second projector 30B may be positioned obliquely to the projection target PO.

Figure 17:
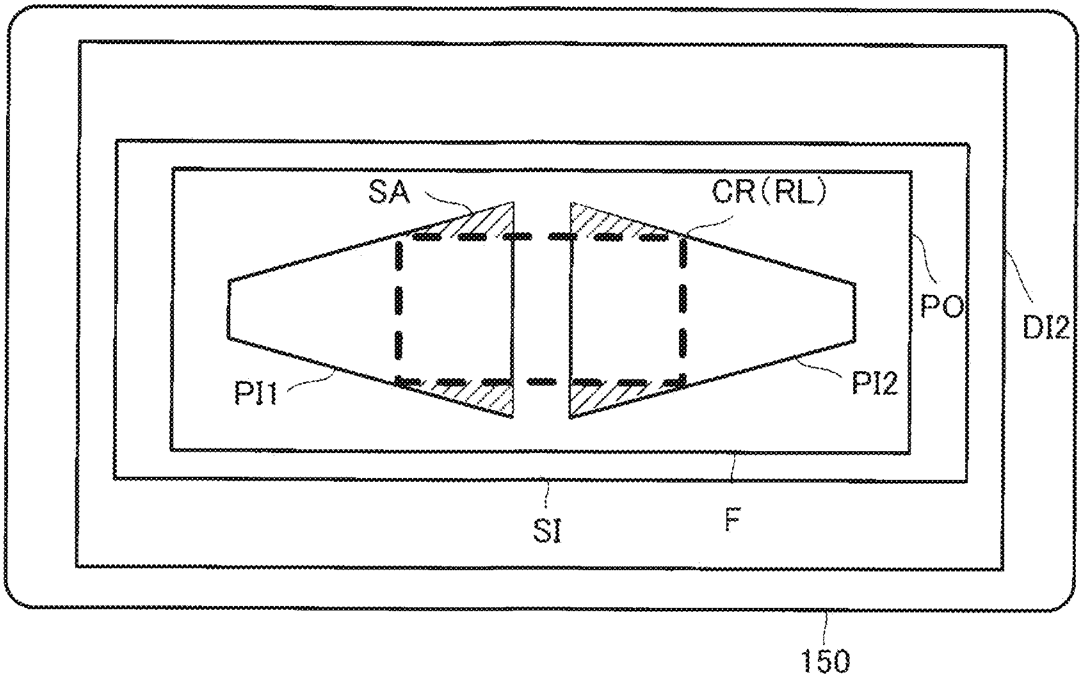
FIG. 17 shows an example of the second display screen DI2.

FIG. 17 shows an example of the second display screen DI2 when the first projector 30A and the second projector 30B are positioned obliquely to the projection target PO. As illustrated in FIG. 17, when the first projector 30A and the second projector 30B are positioned obliquely with respect to the projection target PO, the shapes of the first projection image PI1 and the second projection image PI2 are distorted quadrilaterals that are different from a rectangle, on the display 150.

In this case, when the user of the control system 1 performs a swipe to surround the region CR of the composite image TI of the first projection image PI1 and the second projection image PI2 on the projection target PO with the frame line RL, the pixels in a region SA indicated by hatching in FIG. 17 are not used in the composite image TI and therefore are wasted pixels. In such a case, the outputter 126 may output, to the display 150, the message M notifying the user that a part of the pixels of the first projection image PIL or the second projection image PI2 may not be used for the composite image TI.

Therefore, the first projector 30A includes a ToF sensor as an example. The first projector 30A generates a depth map of a projection surface on the projection target PO, based on measurement data acquired by the ToF sensor, and calculates a first equation of plane of the projection surface, based on the depth map. Next, the first projector 30A calculates a first normal vector of the projection surface, based on the first equation of plane. Next, the first projector 30A calculates the angle formed by the first normal vector and the optical axis vector of the projection lens provided in the projection device 310. Next, when the calculated angle exceeds a predetermined angle that is set in advance, the first projector 30A determines that the first projector 30A is inclined in relation to the projection target PO. Meanwhile, when the calculated angle is equal to or less than the predetermined angle that is set in advance, the first projector 30A determines that the first projector 30A faces directly in front of the projection target PO. The first projector 30A generates a first flag indicating the result of the determination. The first projector 30A transmits the first flag to the information processing device 10.

The ToF sensor is an example of a "distance sensor".

Similarly, the second projector 30B includes a ToF sensor. The second projector 30B generates a depth map of a projection surface on the projection target PO, based on measurement data acquired by the ToF sensor, and calculates a second equation of plane of the projection surface, based on the depth map. Next, the second projector 30B calculates a second normal vector of the projection surface, based on the second equation of plane. Next, the second projector 30B calculates the angle formed by the second normal vector and the optical axis vector of the projection lens provided in the projection device 310. Next, when the calculated angle exceeds a predetermined angle that is set in advance, the second projector 30B determines that the second projector 30B is inclined in relation to the projection target PO. Meanwhile, when the calculated angle is equal to or less than the predetermined angle that is set in advance, the second projector 30B determines that the second projector 30B faces directly in front of the projection target PO. The second projector 30B generates a second flag indicating the result of the determination. The second projector 30B transmits the second flag to the information processing device 10.

The information processing device 10 outputs the message M to the display 150, based on at least one of the first flag received from the first projector 30A and the second flag acquired from the second projector 30B. The message M is a message notifying the user that a part of the pixels of the first projection image PIL or the second projection image PI2 may not be used for the composite image TI.

Alternatively, instead of the first projector 30A and the second projector 30B detecting the inclination of the first projector 30A and the second projector 30B, the information processing device 10 may detect that at least one of the first projector 30A and the second projector 30B is positioned obliquely to the projection target PO. Specifically, as illustrated in FIG. 17, when the outline of the projection target PO is a rectangle on the second display screen DI2, the information processing device 10 determines that the information processing device 10 faces directly in front of the projection target PO, based on the outline of the projection target PO. When the shape of the first projection image PIL is a distorted quadrilateral that is different from a rectangle shape even though it is determined that the information processing device 10 faces directly in front of the projection target PO, the information processing device 10 may determine that the first projector 30A is positioned obliquely to the projection target PO. Similarly, when the shape of the second projection image PI2 is a distorted quadrilateral that is different from a rectangle even though it is determined that the information processing device 10 faces directly in front of the projection target PO, the information processing device 10 may determine that the second projector 30B is positioned obliquely to the projection target PO.

Only one of the first projector 30A and the second projector 30B may detect the inclination. Therefore, only the first projector 30A may generate the first flag and transmit the first flag to the information processing device 10. In this case, the second projector 30B may not calculate the second equation of plane and the second normal vector. The information processing device 10 may detect the inclination of only one of the first projector 30A and the second projector 30B. The message M may be a message notifying the user that a part of the pixels of only the first projection image PI1 may not be used for the composite image TI.

2-4: Modification Example 4

In the above Modification Example 3, as described with reference to FIG. 17, when the shape of the first projection image PI1 is a distorted quadrilateral that is different from a rectangle because the first projector 30A is positioned obliquely to the projection target PO, the first projector 30A may perform geometric correction on the first projection image PI1 and thus adjust the shape of the first projection image PIL on the projection target PO into a rectangle.

Similarly, when the shape of the second projection image PI2 is a distorted quadrilateral that is different from a rectangle because the second projector 30B is positioned obliquely to the projection target PO, the second projector 30B may perform geometric correction on the second projection image PI2 and thus adjust the shape of the second projection image PI2 on the projection target PO into a rectangle.

In this case, the display controller 123 may cause the display 150 to display the second display screen DI2 after the shapes of the first projection image PI1 and the second projection image PI2 on the projection target PO are adjusted into a rectangle.

Alternatively, when the shape of the first projection image PI1 is a distorted quadrilateral that is different from a rectangle on the second display screen DI2, for example, a control signal for adjusting the shape of the first projection image PI1 on the projection target PO into a rectangle may be output from the information processing device 10 to the first projector 30A, based on an operation on the information processing device 10 by the user of the control system 1.

Similarly, when the shape of the second projection image PI2 is a distorted quadrilateral that is different from a rectangle on the second display screen DI2, for example, a control signal for adjusting the shape of the second projection image PI2 on the projection target PO into a rectangle may be output from the information processing device 10 to the second projector 30B, based on an operation on the information processing device 10 by the user of the control system 1.

2-5: Modification Example 5

In the above embodiment, as described with reference to FIGS. 8 and 9, for example, when the vertical width RH of the region RR is greater than the vertical width PH1 of the first projection image PIL and therefore the vertical width RH of the region RR extends beyond the vertical width PH1 of the first projection image PI1, the determiner 125 determines that the operation accepted by the acceptor 124 is abnormal.

However, in this case, the first projector 30A may enlarge the first projection image PI such that the vertical width PH1 of the first projection image PI1 coincides with the vertical width RH of the region RR. When the first projector 30A enlarges the first projection image PI1, the vertical width RH of the region RR and the vertical width PH1 of the first projection image PI1 coincide with each other, and the vertical width RH of the region RR does not extend beyond the vertical width PH1 of the first projection image PI1, on the second display screen DI2 illustrated in FIG. 8.

In this case, the first information AI1 includes the enlargement ratio of the first projection image PI in addition to the first adjustment amount AA1.

The same applies to the relationship between the second projection image PI2 and the region RR. In this case, the second information AI2 includes the enlargement ratio of the second projection image PI2 in addition to the second adjustment amount AA2.

2-6: Modification Example 6

In the above embodiment, as described with reference to FIGS. 6 and 7, when the ratio of the overlap width DW1 of the overlap region DR1 between the region RR surrounded by the frame line RL and the first projection image PI1 is equal to or higher than the first value, it is determined that the operation accepted by the acceptor 124 is abnormal.

In the above embodiment, it is assumed that the first projection image PI1 and the second projection image PI2 are spaced apart from each other in the projection target PO. In this case, even if both the first projection image PI1 and the second projection image PI2 are simply white light, the information processing device 10 can detect the position of the region of the first projection image PI and the position of the overlap region DR1 in FIG. 6.

However, when the first projection image PI1 and the second projection image PI2 partially overlap each other from the beginning and both the first projection image PI1 and the second projection image PI2 are white light, it is difficult for the information processing device 10 to detect the position of the region of the first projection image PI1 and the position of the overlap region DR1 in FIG. 6. The information processing device 10 employs raster images having different colors from each other as the first projection image PI1 projected from the first projector 30A and the second projection image PI2 projected from the second projector 30B.

Figure 18:
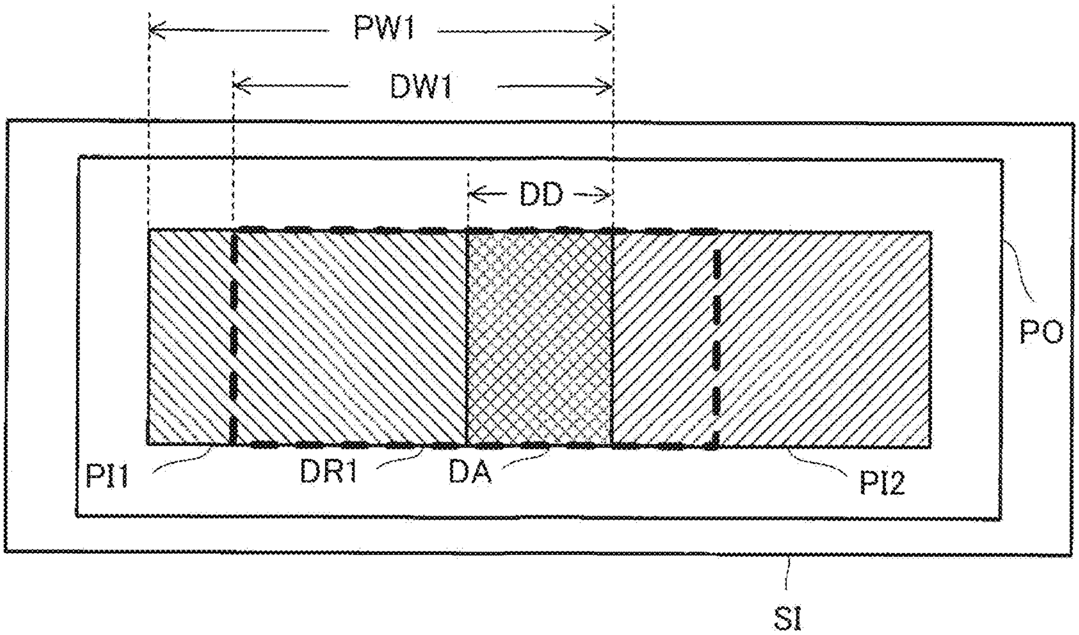
FIG. 18 shows a picked-up image SI in Modification Example 6.

FIG. 18 shows a picked-up image SI in Modification Example 6. As illustrated in FIG. 18, first projection image PI1 and second projection image PI2 are raster images that are different from each other. Therefore, in the initial state, an area where only the first projection image PIL exists, an area where only the second projection image PI2 exists, and an overlap area DA where the first projection image PI1 and the second projection image PI2 overlap each other are displayed in different colors. As a result, the information processing device 10 can easily detect the position of the region of the first projection image PI1 and the position of the overlap region DR1.

In the above embodiment, when the ratio of the overlap width DW1 to the width PW1 is equal to or higher than the first value, the determiner 125 determines that the operation accepted by the acceptor 124 is abnormal. However, in this Modification Example 6, preferably, when the ratio of the value found by subtracting the overlap width DD of the original overlap area DA from the overlap width DW1 to the width PW1 is equal to or higher than the first value, the determiner 125 determines that the operation accepted by the acceptor 124 is abnormal.

2-7: Modification Example 7

In the above embodiment, it is assumed that the shape of the region RR surrounded by the frame line RL is a rectangle. However, the shape of the region RR may be another shape. For example, the shape of the region RR may be a triangle or a polygon having five or more vertices.

For example, when executing simple stacking for multi-projection in the control system 1, the user of the control system 1 may draw the frame line RL of a triangle or a pentagon by a swipe with the indicator F on the second display screen DI2.

In this case, the first projector 30A changes the shape of the first projection image PIL in accordance with the shape of the frame line RL. Similarly, the second projector 30B changes the shape of the second projection image PI2 in accordance with the shape of the frame line RL. Then, the first projector 30A and the second projector 30B project the first projection image PI1 and the second projection image PI2 at the same position.

2-8: Modification Example 8

In the above embodiment, the communication controller 129 causes the communication device 170 to transmit the first information AI1 to the first projector 30A and causes the communication device 170 to transmit the second information AI2 to the second projector 30B. However, for example, the communication controller 129 may only cause the communication device 170 to transmit the first information AI1 to the first projector 30A. This is because, depending on the position of the frame line RL on the second display screen DI2, a composite image may be constructed simply by adjusting the first projection image PIL in relation to the second projection image PI2. In this case, the processing device 120 may not include the second generator 128.

3: Summary of Present Disclosure

A summary of the present disclosure will be given below in the form of appendices.

(Appendix 1) A control method for an electronic device configured to communicate with a first projector that projects a first projection image onto a projection target is provided, and the control method includes: acquiring a picked-up image generated by a camera, the picked-up image including the first projection image and a second projection image projected from a second projector that is different from the first projector; causing a display to display a screen including the picked-up image; accepting, via the screen, an operation of designating a range in which a composite image formed by combining the first projection image and the second projection image is formed on the projection target; generating first information including at least one first adjustment amount of the first projection image to form the composite image, based on the operation; and transmitting the first information to the first projector.

Thus, as the user designates the projection range on the display 150 provided in an electronic device different from the projector 30 in order to designate the projection range 41 the projection image PI, multi-projection can be executed.

More specifically, with the above control method, when the user of the electronic device performs an operation on the display 150 to designate the range in which the composite image TI is formed on the projection target PO, the electronic device can generate information based on the operation. As a result, by using the electronic device, the user of the electronic device can easily generate information for forming the composite image TI projected in multi-projection such as stacking or tiling.

(Appendix 2) In the control method according to Appendix 1, the operation is an operation of surrounding at least a part of the picked-up image with a frame line including at least one of a straight line and a curved line on the screen.

Thus, the user of the electronic device can designate the region where the composite image TI is formed on the projection target PO by a simple operation.

(Appendix 3) The control method according to Appendix 1 or 2 further includes: accepting a selection about whether to generate the composite image by stacking or by tiling; and outputting a message recommending that the composite image is to be generated by stacking in accordance with an overlap width between a region of the first projection image and a region surrounded by the frame line or an overlap width between a region of the second projection image and the region surrounded by the frame line, on the screen, when a selection to generate the composite image by tiling is accepted.

Thus, when the operation on the display 150 by the user of the electronic device is suitable for multi-projection by stacking, the user of the electronic device can be prompted to execute multi-projection by stacking.

(Appendix 4) In the control method according to one of Appendices 1 to 3, the picked-up image displayed on the display is displayed in a state of being viewed in a plan view by projective transformation.

Thus, even when the first projection image PI1 and the second projection image PI2 are obliquely picked up by the camera provided in the electronic device, the user of the electronic device can easily operate the display 150.

(Appendix 5) The control method according to one of Appendices 2 to 4 further includes outputting a message indicating that a composite image extending beyond a region of the first projection image cannot be formed when at least a part of the frame line extends beyond the region of the first projection image included in the picked-up image displayed on the display.

Thus, the user of the electronic device can easily understand that a connected image in a range larger than a white image as the projection image PI cannot be constructed.

(Appendix 6) The control method according to one of Appendices 1 to 5 further includes: acquiring a first flag from the first projector when it is determined that the first projector is inclined in relation to the projection target; and outputting a message indicating that it is probable that at least a part of a plurality of pixels forming the first projection image is not used for the composite image when the first flag is acquired.

Thus, the user of the electronic device can recognize that at least one of the first projector 30A and the second projector 30B is installed obliquely to the projection target PO.

(Appendix 7) In the control method according to Appendix 6, the first flag is generated, based on a first normal vector of a projection surface of the projection target, calculated by the first projector, based on a measurement value of a first distance sensor, and an optical axis vector of a projection lens provided in the first projector.

Thus, the first projector 30A itself can generate information indicating that the first projector 30A is installed obliquely to the projection target PO. Similarly, the second projector 30B itself can generate information indicating that the second projector 30B is installed obliquely to the projection target PO.

(Appendix 8) A control system including a first projector that projects a first projection image onto a projection target and an electronic device configured to communicate with the first projector is provided, and the electronic device executes: acquiring a picked-up image generated by a camera, the picked-up image including the first projection image and a second projection image projected from a second projector that is different from the first projector; causing a display to display a screen including the picked-up image; accepting, via the screen, an operation of designating a range in which a composite image formed by combining the first projection image and the second projection image is formed on the projection target; generating first information including at least one first adjustment amount of the first projection image to form the composite image, based on the operation; and transmitting the first information to the first projector, and the first projector executes: adjusting the first projection image, based on the first adjustment amount.

Thus, as the user designates the projection range on the display 150 provided in an electronic device different from the projector 30 in order to designate the projection range of the projection image PI, stacked projection or tiled projection can be executed as multi-projection.

More specifically, with the above control method, when the user of the electronic device performs an operation on the display 150 to designate the range in which the composite image TI is formed on the projection target PO, the electronic device can generate information based on the operation. As a result, by using the electronic device, the user of the electronic device can easily generate information for forming the composite image TI projected in multi-projection such as stacking or tiling.

(Appendix 9) A non-transitory computer-readable storage medium storing an information processing program is provided, and the information processing program causes a computer that controls an electronic device configured to communicate with a first projector that projects a first projection image onto a projection target, to execute: acquiring a picked-up image generated by a camera, the picked-up image including the first projection image and a second projection image projected from a second projector that is different from the first projector; causing a display to display a screen including the picked-up image; accepting, via the screen, an operation of designating a range in which a composite image formed by combining the first projection image and the second projection image is formed on the projection target; generating first information including at least one first adjustment amount of the first projection image to form the composite image, based on the operation; and transmitting the first information to the first projector.

Thus, as the user designates the projection range on the display 150 provided in an electronic device different from the projector 30 in order to designate the projection range of the projection image PI, stacked projection or tiled projection can be executed as multi-projection.

More specifically, with the above control method, when the user of the electronic device performs an operation on the display 150 to designate the range in which the composite image TI is formed on the projection target PO, the electronic device can generate information based on the operation. As a result, by using the electronic device, the user of the electronic device can easily generate information for forming the composite image TI projected in multi-projection such as stacking or tiling.

What is claimed is:

1. A control method for an electronic device configured to communicate with a first projector that projects a first projection image onto a projection target, the control method comprising:

acquiring a picked-up image generated by a camera, the picked-up image including the first projection image and a second projection image projected from a second projector that is different from the first projector;

causing a display to display a screen including the picked-up image;

accepting, via the screen, an operation of designating a range in which a composite image formed by combining the first projection image and the second projection image is formed on the projection target;

generating first information including at least one first adjustment amount of the first projection image to form the composite image, based on the operation; and transmitting the first information to the first projector, wherein the operation is a user's operation of drawing a frame line surrounding at least a part of the picked-up image, the frame line including at least one of a straight line and a curved line on the screen.

2. The control method according to claim 1, further comprising:

accepting a selection about whether to generate the composite image by stacking or by tiling; and outputting a message recommending that the composite image is to be generated by stacking in accordance with an overlap width between a region of the first projection image and a region surrounded by the frame line or an overlap width between a region of the second projection image and the region surrounded by the frame line, on the screen, when a selection to generate the composite image by tiling is accepted.

3. The control method according to claim 1, wherein the picked-up image displayed on the display is displayed in a plan view by projective transformation.

4. The control method according to claim 1, further comprising:

outputting a message indicating that a composite image extending beyond a region of the first projection image cannot be formed when at least a part of the frame line extends beyond the region of the first projection image included in the picked-up image displayed on the display.

5. The control method according to claim 1, further comprising:

acquiring a first flag from the first projector when it is determined that the first projector is inclined in relation to the projection target; and outputting a message indicating that it is probable that at least a part of a plurality of pixels forming the first projection image is not used for the composite image when the first flag is acquired.

6. The control method according to claim 5, wherein the first flag is generated, based on a first normal vector of a projection surface of the projection target, calculated by the first projector, based on a measurement value of a first distance sensor, and an optical axis vector of a projection lens provided in the first projector.

7. A non-transitory computer-readable storage medium storing an information processing program, the information processing program causing a computer that controls an electronic device configured to communicate with a first projector that projects a first projection image onto a projection target, to execute:

acquiring a picked-up image generated by a camera, the picked-up image including the first projection image and a second projection image projected from a second projector that is different from the first projector;

causing a display to display a screen including the picked-up image;

accepting, via the screen, an operation of designating a range in which a composite image formed by combining the first projection image and the second projection image is formed on the projection target, the operation being a user's operation of drawing a frame line surrounding at least a part of the picked-up image, the frame line including at least one of a straight line and a curved line on the screen;

generating first information including at least one first adjustment amount of the first projection image to form the composite image, based on the operation; and transmitting the first information to the first projector.

8. A control method for an electronic device configured to communicate with a first projector that projects a first projection image onto a projection target, the control method comprising:

acquiring a picked-up image generated by a camera, the picked-up image including the first projection image and a second projection image projected from a second projector that is different from the first projector;

causing a display to display a screen including the picked-up image;

accepting, via the screen, an operation of designating a range in which a composite image formed by combining the first projection image and the second projection image is formed on the projection target;

generating first information including at least one first adjustment amount of the first projection image to form the composite image, based on the operation;

transmitting the first information to the first projector;

acquiring a first flag from the first projector when it is determined that the first projector is inclined in relation to the projection target; and outputting a message indicating that it is probable that at least a part of a plurality of pixels forming the first projection image is not used for the composite image when the first flag is acquired.

* * * * *